(12) United States Patent
Nozawa (10) Patent No.: US 11,091,048 B2
(45) Date of Patent: Aug. 17, 2021

(54) NOISE REDUCTION OF ACCESSORY DEVICES WHEN CHARGING AN ELECTRIC VEHICLE

(71) Applicant: TOYOTA JIDOSHA KABUSHIKI KAISHA, Toyota (JP)

(72) Inventor: Takashi Nozawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 16/680,580

(22) Filed: Nov. 12, 2019

(65) Prior Publication Data

US 2020/0189411 A1   Jun. 18, 2020

(30) Foreign Application Priority Data

Dec. 17, 2018 (JP) .............................. JP2018-235354

(51) Int. Cl.
*B60L 53/22* (2019.01)
*H02J 7/16* (2006.01)
*B60L 50/60* (2019.01)
*B60L 53/80* (2019.01)

(52) U.S. Cl.
CPC ............... *B60L 53/22* (2019.02); *B60L 50/60* (2019.02); *H02J 7/16* (2013.01); *B60L 53/80* (2019.02)

(58) Field of Classification Search
CPC ...................................................... B60L 53/22
USPC ...................................................... 320/104
See application file for complete search history.

(56) References Cited

U.S. PATENT DOCUMENTS

| 4,584,714 A  * | 4/1986  | Fukuhara   | H03G 3/345 455/219 |
| 5,519,889 A  * | 5/1996  | Hipp       | H02M 1/12 363/41   |
| 5,998,884 A  * | 12/1999 | Kitamine   | H02M 7/5387 307/10.1 |
| 2003/0026116 A1* | 2/2003  | Ueki      | H02M 3/33569 363/60 |
| 2012/0049794 A1* | 3/2012  | Han       | B60L 53/14 320/109 |
| 2012/0314461 A1* | 12/2012 | Yoshikawa | H02M 1/4225 363/40 |

FOREIGN PATENT DOCUMENTS

| JP | 2017-212775 A | 11/2017 |
| JP | 2018-038201 A | 3/2018  |

\* cited by examiner

*Primary Examiner* — Jerry D Robbins
(74) *Attorney, Agent, or Firm* — Oliff PLC (57) ABSTRACT

An electric vehicle may include a voltage converter, a charging inlet and a controller. The voltage converter is connected between the main and sub batteries. The charging inlet is connected with the main battery and connectable to power supplying equipment. The controller drives the voltage converter by a carrier signal having a first frequency while the power supplying equipment is not connected. While the charging inlet is connected to the power supplying equipment, the controller may execute one of: (1) a first control in which the controller intermittently drives the voltage converter; (2) a second control in which the controller continuously drives the voltage converter while varying a frequency of the carrier signal; and (3) a third control in which the controller changes a frequency of the carrier signal from the first frequency to a second frequency which is lower than the first frequency.

5 Claims, 8 Drawing Sheets

NOISE REDUCTION OF ACCESSORY DEVICES WHEN CHARGING AN ELECTRIC VEHICLE

CROSS-REFERENCE TO RELATED APPLICATION

This application claims priority to Japanese Patent Application No. 2018-235354 filed on Dec. 17, 2018, the contents of which are hereby incorporated by reference into the present application.

TECHNICAL FIELD

The teaching disclosed herein relates to an electric vehicle. Especially, the teaching disclosed herein relates to an electric vehicle including a charging inlet connectable to power supplying equipment located outside the vehicle.

BACKGROUND

An electric vehicle capable of charging its main battery by using power supplying equipment located outside the vehicle is known. Japanese Patent Application Publication No. 2018-038201 (Patent Document 1) and Japanese Patent Application Publication No. 2017-212775 (Patent Document 2) describe examples of such an electric vehicle. The main battery is a power source for supplying power to a traction motor. The power supplying equipment located outside the vehicle is connected to a charging inlet provided in the vehicle.

The electric vehicle of Patent Document 1 charges its main battery as well as its sub battery by using power supplying equipment located outside the vehicle. The sub battery is a power source having a lower output voltage than the main battery. The sub battery is provided to supply power primarily to onboard low-power devices such as a radio and a room lamp. The low-power devices that are operated by the power from the sub battery may collectively be termed accessories. A voltage converter (step-down converter) is connected between the main battery and the sub battery, and this voltage converter steps down an output voltage of the main battery to the voltage of the sub battery.

The electric vehicle of Patent Document 2 isolates a sub battery system (which is a circuit of a sub battery and accessories) from a main battery system (which is a circuit of a main battery and an external power source) in a case where the accessories operate while power supplying equipment located outside the vehicle is connected to the electric vehicle. By doing so, noise generated by the accessories is prevented from propagating to the power supplying equipment. The "electric vehicle" herein includes a hybrid vehicle provided with an engine and a traction motor and a vehicle provided with a battery and a fuel cell for a traction motor.

SUMMARY

When a user uses the accessories such as a radio and a room lamp while the main battery is charged by the power supplying equipment located outside the vehicle, a remaining power charge of the sub battery decreases. When the remaining power charge of the sub battery degrades while the main battery is charged, a controller of the electric vehicle activates the voltage converter. As aforementioned, the voltage converter is a step-down converter that steps down the voltage of the main battery and supplies it to the sub battery. The voltage converter that is in operation is connected to the main battery at the same time the power supplying equipment located outside the vehicle is connected to the main battery. That is, the voltage converter that is in operation is electrically connected with the power supplying equipment located outside the vehicle through a charging inlet. When this happens, noise generated by the voltage converter propagates to the power supplying equipment through the charging inlet. Since the sub battery is charged by the main battery, the technique described in Patent Document 2 cannot be used. That is, the sub battery system including the voltage converter cannot be isolated from the main battery system. Thus, the noise generated by the voltage converter propagates to the external power supplying equipment through the charging inlet. The disclosure herein provides a technique that reduces an influence of noise, which is generated by a voltage converter connected between a main battery and a sub battery, on external power supplying equipment while the main battery is charged by the external power supplying equipment.

An electric vehicle disclosed herein may comprise a main battery, a sub battery, a voltage converter, a charging inlet, and a controller. An output voltage of the sub battery may be lower than an output voltage of the main battery. The voltage converter may be connected between the main battery and the sub battery and may be configured to step down a voltage of the main battery to a voltage of the sub battery. The charging inlet may be connected with the main battery and may be connectable to power supplying equipment located outside the electric vehicle. The controller may be configured to drive the voltage converter by using a carrier signal having a first frequency while the power supplying equipment is not connected to the charging inlet. While the charging inlet is connected to the power supplying equipment, the controller may be configured to execute one of:

(1) a first control in which the controller intermittently drives the voltage converter;

(2) a second control in which the controller continuously drives the voltage converter while varying a frequency of the carrier signal; and (3) a third control in which the controller changes a frequency of the carrier signal from the first frequency to a second frequency to drive the voltage converter, the second frequency being lower than the first frequency.

A time average of noise power is decreased when the controller intermittently drives the voltage converter (the first control), by which the influence of noise on the power supplying equipment is reduced. Alternatively, when the controller continuously drives the voltage converter while varying the carrier frequency (the second control), a peak frequency of the noise is dispersed, by which peak power is decreased. As a result, the influence of the noise on the power supplying equipment is reduced. The peak frequency of the noise can be decreased when the controller drives the voltage converter at the second frequency, which is lower than the first frequency which is used when the vehicle is traveling (the third control). In general, electric devices including the external power supplying equipment have large tolerable noise peak power to low frequency band. As such, the influence of the noise on the external power supplying equipment is reduced by decreasing the peak frequency as well. In the third control, the voltage converter may be driven continuously or intermittently. The influence of the noise on the power supplying equipment can further be reduced by decreasing the carrier frequency as well as intermittently driving the voltage converter.

Details and further improvements of the teaching disclosed herein will be described in the following DETAILED DESCRIPTION.

DETAILED DESCRIPTION

Firstly, some features of the teaching described in the following embodiment will be listed.

An electric vehicle may comprise: a main battery configured to supply electric power to a traction motor; a sub battery, an output voltage of which is lower than an output voltage of the main battery; a voltage converter connected between the main battery and the sub battery, the voltage converter configured to step down a voltage of the main battery to a voltage of the sub battery; a charging inlet connected with the main battery and connectable to power supplying equipment located outside the electric vehicle; and a controller configured to drive the voltage converter by using a carrier signal having a first frequency while the power supplying equipment is not connected to the charging inlet. While the charging inlet is connected to the power supplying equipment, the controller may be configured to execute one of: (1) a first control in which the controller intermittently drives the voltage converter; (2) a second control in which the controller continuously drives the voltage converter while varying a frequency of the carrier signal; and (3) a third control in which the controller changes a frequency of the carrier signal from the first frequency to a second frequency to drive the voltage converter, the second frequency being lower than the first frequency.

When the voltage converter is driven intermittently, a voltage of a power line connecting an accessory and the sub battery may change. This may change brightness of a light (which is one type of the accessory) connected to the sub battery. Such a change in the brightness of the light may make a passenger inside the vehicle feel uncomfortable. The controller may be configured to prohibit the first control while the light connected to the sub battery is on. That is, the controller may be configured to execute one of the second control and the third control while the light connected to the sub battery is on.

When the carrier frequency is changed, harmonic noise is generated. The harmonic noise might be superposed on an output of a radio. The controller may be configured to prohibit the second control while the radio connected to the sub battery is in operation. That is, the controller may be configured to execute one of the first control and the third control while the radio connected to the sub battery is on.

The controller may be configured to output a signal recommending that one of the light and the radio be turned off when the light and the radio are both on. Alternatively, when the light and the radio are both on, the controller may be configured to output the aforementioned signal and further prohibit the first and second controls and execute the third control.

Figure 1:
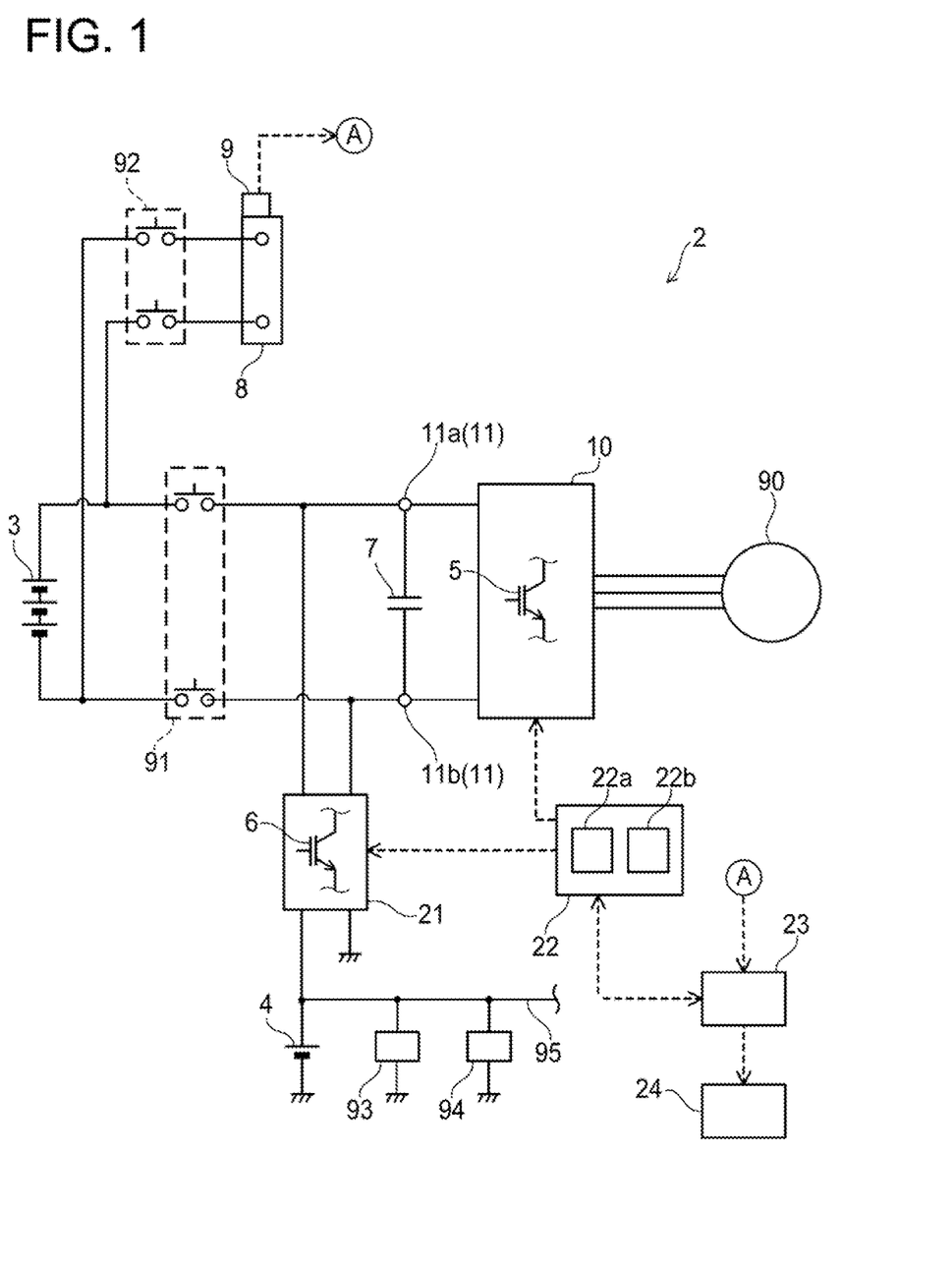
FIG. 1 is a block diagram of a power system of an electric vehicle of an embodiment.

(Embodiment) An electric vehicle of an embodiment will be described with reference to the drawings. FIG. 1 shows a block diagram of a power system of an electric vehicle 2. The electric vehicle 2 includes a main battery 3, a sub battery 4, a power converter 10, a voltage converter 21, a traction motor 90, a power controller 22, and a system controller 23.

The main battery 3 stores power for driving the traction motor 90, and an output voltage thereof is 100 volts or more. The main battery 3 is a power source that supplies power to the traction motor 90.

The sub battery 4 stores power to be supplied to low-power devices such as a room lamp 93 and a radio 94. An output voltage of the sub battery 4 is lower than the output voltage of the main battery 3. The output voltage of the sub battery 4 is, for example, 12 volts. The devices that are operated by the power from the sub battery 4 are collectively termed accessories.

Accessories such as the room lamp 93 and the radio 94 are connected to the sub battery 4 via an accessory power line 95. The accessory power line 95 is routed throughout the body of the vehicle. In addition to the room lamp 93 and the radio 94, various accessories such as a car navigation device are connected to the accessory power line 95. A negative terminal of the sub battery 4 and negative terminals of the accessories are connected via a body ground.

The power converter 10 is a device configured to convert output power (DC power) of the main battery 3 to driving power (AC power) for the traction motor 90. The power converter 10 is specifically an inverter, and switching elements 5 provided therein convert the power. In FIG. 1, only one switching element 5 is depicted, however, the power converter 10 is provided with a plurality of switching elements. The switching elements 5 are controlled by the power controller 22.

DC terminals 11 of the power converter 10 are connected to the main battery 3 via a system main relay 91, and AC terminals thereof are connected to the traction motor 90. The system main relay 91 is closed while a main switch of the vehicle is on. A smoothing capacitor 7 is connected between a positive terminal 11a and a negative terminal 11b of the DC terminals 11.

The voltage converter 21 is connected between the main battery 3 and the sub battery 4. The voltage converter 21 is a step-down converter (down converter) configured to step down the output voltage of the main battery 3. Main components of the voltage converter 21 are switching elements 6, and the switching elements 6 provided therein convert the voltage. Although only one switching element 6 is depicted in FIG. 1, the voltage converter 21 is provided with a plurality of switching elements. The switching elements 6 are also controlled by the power controller 22. The sub battery 4 is charged by the power of the main battery 3 while the voltage of the power from the main battery is stepped down by the voltage converter 21. The switching elements 5, 6 are typically power transistors for power conversion.

As described above, the power controller 22 controls the switching elements 5, 6. The power controller 22 is a computer provided with a central processing unit (CPU), a memory, and an input/output interface. The power controller 22 is provided with a carrier signal generator 22a and a drive signal generator 22b. The carrier signal generator 22a and the drive signal generator 22b are realized by software. A part of the carrier signal generator 22a and/or a part of the drive signal generator 22b may be realized by hardware.

The carrier signal generator 22a is configured to generate a carrier signal having a predetermined frequency. The carrier signal is a reference wave for generating drive signals (such as PWM signals) for the switching elements 5, 6. The drive signal generator 22b is configured to generate drive signals for the switching elements 5, 6 based on the carrier signal. The power controller 22 receives instructions regarding target outputs of the power converter 10 and the voltage converter 21 from its host system controller 23. The drive signal generator 22b generates the drive signals for the switching elements 5, 6 based on the carrier signal such that the power converter 10 and the voltage converter 21 follow their target outputs. The power controller 22 is configured to be capable of changing the frequency of the carrier signal (carrier frequency).

The system controller 23 is configured to integrally control an entirety of the electric vehicle 2. The system controller 23 is a computer provided with a central processing unit (CPU), a memory, and an input/output interface. The system controller 23 controls the power controller 22, the system main relay 91, a charge relay 92, the main battery 3, and the sub battery 4. An instrument panel 24 is connected to the system controller 23. The instrument panel 24 is provided with various warning lamps and displays. The warning lamps and displays are controlled according to instructions from the system controller 23.

The system controller 23 is configured to determine the target output of the power converter 10 based on a vehicle speed and an accelerator pedal position of the electric vehicle 2. Further, the system controller 23 is configured to determine the target output of the voltage converter 21 based on a remaining power charge (SOC: State of Charge) of the sub battery 4.

The electric vehicle 2 further includes a charging inlet 8. The charging inlet 8 is a device connectable to a connector of power supplying equipment (not shown) located outside the vehicle. The charging inlet 8 is provided on a body (not shown) of the vehicle. The main battery 3 can be charged by power supplied from the power supplying equipment. The charging inlet 8 is connected to the main battery 3 via the charge relay 92. The charge relay 92 is open while the vehicle is running. The charging inlet 8 is provided with a connector sensor 9 configured to detect whether or not the connector of a cable extending from the power supplying equipment is connected. A signal from the connector sensor 9 is sent to the system controller 23. When the connector of the power supplying equipment (not shown) is connected to the charging inlet 8, the system controller 23 closes the charge relay 92. The information from the connector sensor 9 is passed onto the power controller 22 from the system controller 23. That is, the power controller 22 can also be informed whether or not the connector of the power supplying equipment is connected to the charging inlet 8.

A relationship between charging by the power supplying equipment located outside the vehicle and charging of the sub battery 4 will be described. As described above, the electric vehicle 2 is configured to charge the main battery 3 by the power supplied from the power supplying equipment located outside the vehicle. The power supplying equipment is connected to the charging inlet 8. On the other hand, if the user uses the accessories such as the room lamp 93 and the radio 94 during the charging, the remaining power charge SOC of the sub battery 4 thereby decreases. When the remaining power charge SOC of the sub battery 4 goes down below a predetermined threshold, the power controller 22 activates the voltage converter 21 according to an instruction from the system controller 23. The sub battery 4 is charged using the power of the main battery 3, which is being charged, by the voltage converter 21. In the voltage converter 21, the switching elements 6 convert the voltage. The switching elements 6 of the voltage converter 21 generate noise (switching noise). The noise generated by the switching elements 6 of the voltage converter 21 propagates to the power supplying equipment through the charge relay 92 and the charging inlet 8. A noise resistance of ground facilities such as the power supplying equipment may be lower than a noise resistance of on-board devices. Thus, such noise propagation from the vehicle to the power supplying equipment might at a first affect the power supplying equipment.

Figure 2:
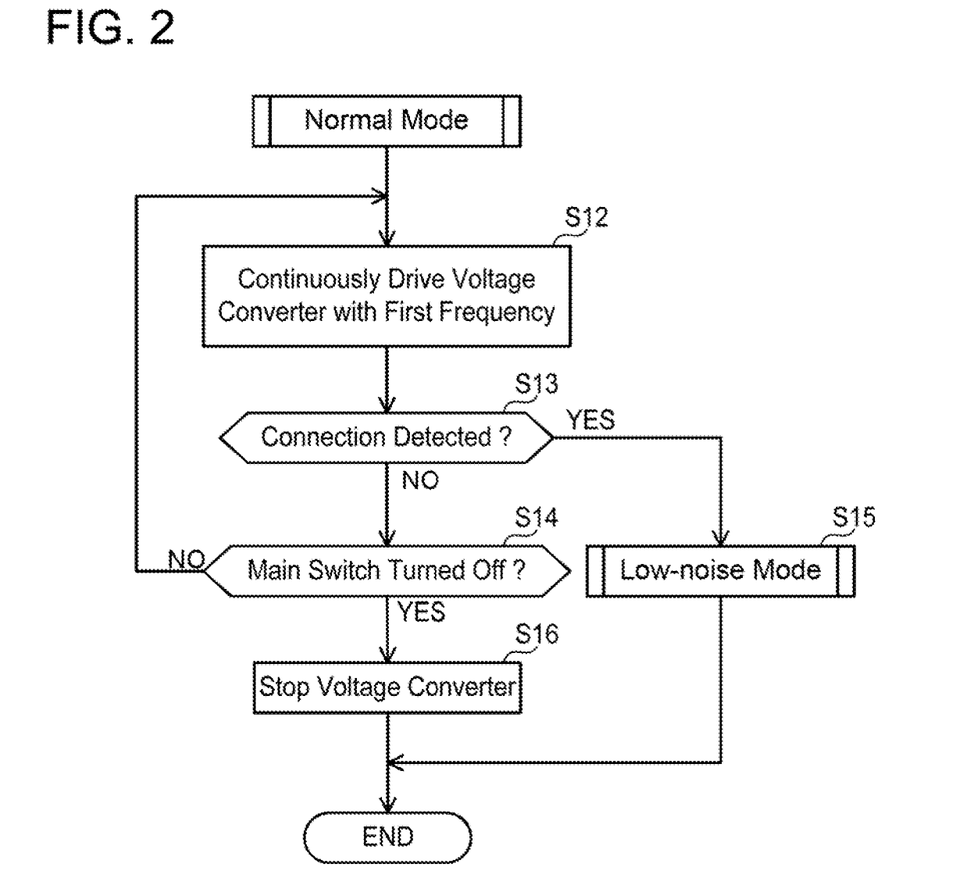
FIG. 2 is a flowchart of a sub battery charging process (normal mode).

In view of this, the electric vehicle 2 is capable of reducing the noise generated by the voltage converter 21 while the power supplying equipment is connected to the charging inlet 8, as compared to while the connector is not connected. The power controller 22 continuously drives the voltage converter 21 in a normal mode at all times while the connector of the power supplying equipment is not connected to the charging inlet 8. FIG. 2 shows a flowchart of a sub battery charging process in the normal mode. The process of FIG. 2 is started when the main switch of the vehicle is turned on. The process of FIG. 2 and processes of flowcharts to be described hereinbelow are executed by cooperation of the system controller 23 and the power controller 22. The system controller 23 is monitoring states of some of the accessories connected to the accessory power line 95, such as the room lamp 93 and the radio 94. That is, the system controller 23 is capable of detecting whether or not specific accessories are in operation.

The power controller 22 continuously drives the voltage converter 21 with a first frequency (step S12). The switching elements 6 of the voltage converter 21 are turned on and off synchronized with the carrier signal. In other words, a switching frequency of the switching elements 6 is equal to the frequency of the carrier signal (carrier frequency). In the normal mode, the power controller 22 generates a drive signal based on the carrier signal having the first frequency and drives the switching elements 6 of the voltage converter 21 according to this drive signal.

The power controller 22 adjusts the output of the voltage converter 21 such that the remaining power charge SOC of the sub battery 4 is maintained within a predetermined range. Specifically, the power controller 22 adjusts the output of the voltage converter 21 such that the remaining power charge SOC of the sub battery 4 is maintained between an upper limit threshold Sup and a lower limit threshold Sd1. By maintaining the remaining power charge SOC of the sub battery 4 within the predetermined range, deterioration of the sub battery 4 can be suppressed. The power controller 22 continuously drives the voltage converter 21 at all times until the main switch of the vehicle is turned off (step S14: NO, S12). When the main switch of the vehicle is turned off, the power controller 22 stops the voltage converter 21 (step S14: YES, S16). Hereinbelow, the remaining power charge SOC of the sub battery 4 will be simply termed SOC. In the drawings as well, "SOC" indicates the remaining power charge of the sub battery 4.

In the normal mode, the power controller 22 is checking whether or not the connector of the power supplying equipment has been connected based on a signal from the connector sensor 9 (step S13). In a case where connection of the connector of the power supplying equipment is not detected (step S13: NO), the power controller 22 continuously drives the voltage converter 21 at all times (step S14: NO, S12). On the other hand, in a case where the connection of the connector of the power supplying equipment is detected, the power controller 22 shifts to a low-noise mode (step S13: YES, step S15). The power supplying equipment is not connected to the charging inlet 8 while the vehicle is traveling. Due to this, the power controller 22 continuously drives the voltage converter 21 at all times based on the carrier signal having the first frequency while the vehicle is running.

Figure 3:
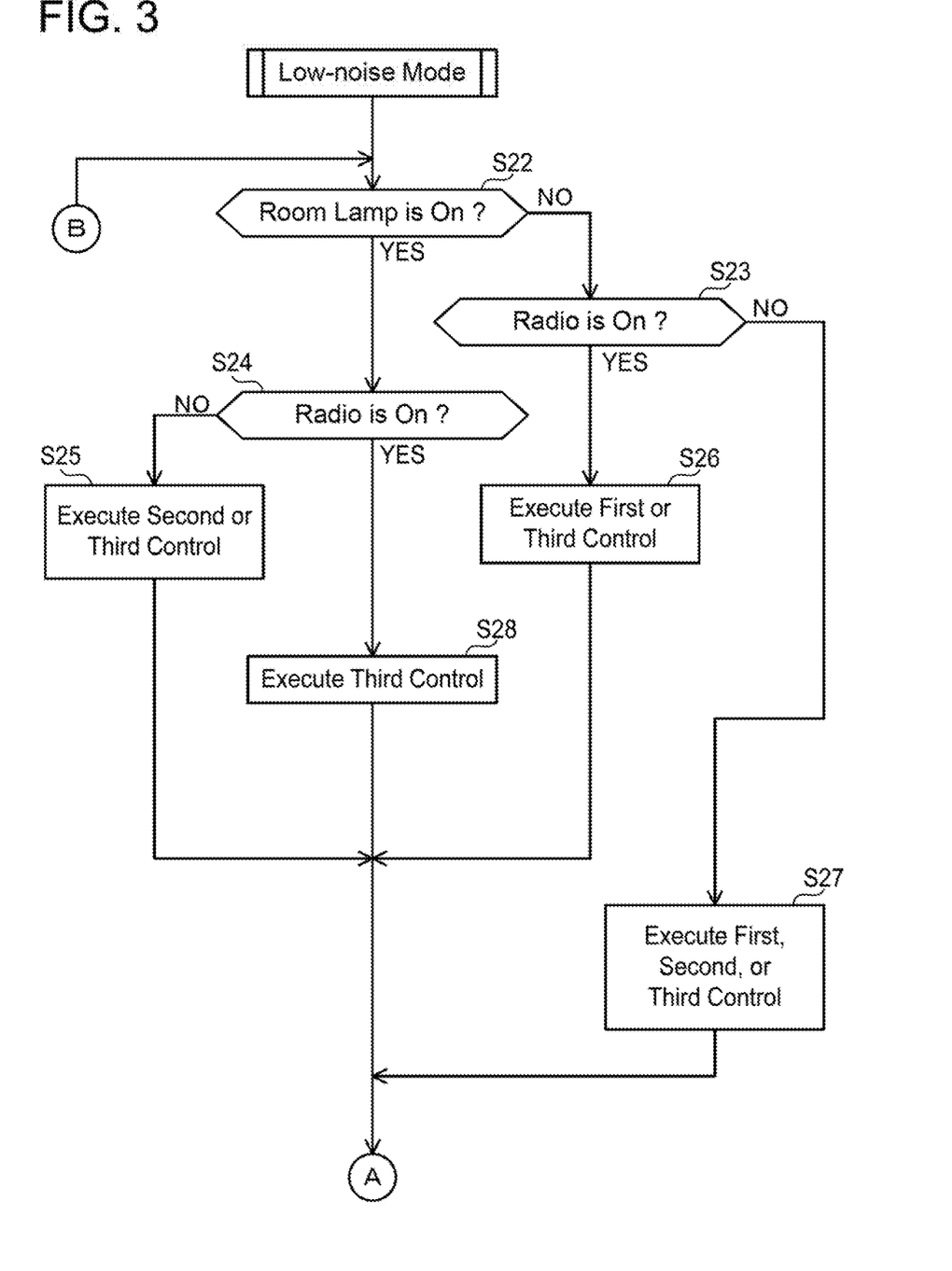
FIG. 3 is a flowchart (1) of a sub battery charging process (low-noise mode).
Figure 4:
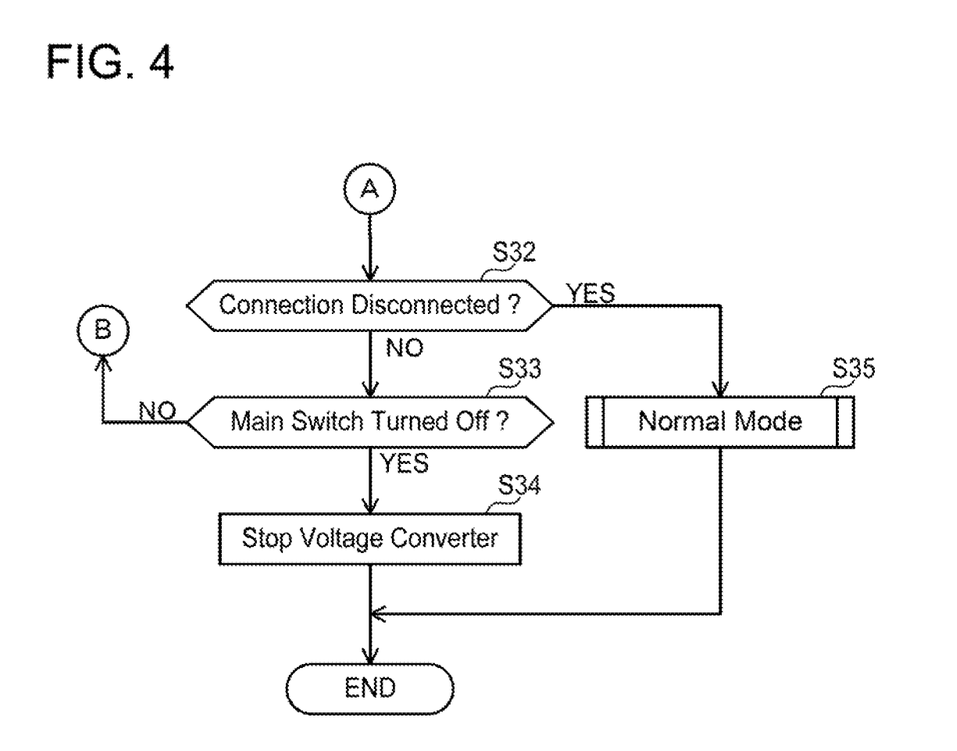
FIG. 4 is a flowchart (2) of the sub battery charging process (low-noise mode).

FIGS. 3 and 4 show flowcharts of the low-noise mode. At least one of three types of control rules is selected and executed in the low-noise mode. The three types of control rules are as follows:
(1) First control: Intermittently drive the voltage converter 21;
(2) Second control: Continuously drive the voltage converter 21 while changing the frequency of the carrier signal (carrier frequency) used for controlling the switching elements 6 of the voltage converter 21; and
(3) Third control: Drive the voltage converter 21 with a carrier signal having a second frequency which is lower than the first frequency.

Reasons why the noise propagation to the charging inlet 8 is reduced by the above three types of control will be described later.

When the first control is executed, that is, when the voltage converter 21 is intermittently driven, a voltage of the accessory power line 95, which connects the sub battery 4, the accessories (such as the room lamp 93 and the radio 94) and the voltage converter 21, changes. Some of the accessories are affected by such a change in the supply voltage. In other words, some of the accessories are sensitive to the change in the supply voltage. An example of such accessories is the room lamp 93. When the supply voltage to the room lamp 93 changes, this may change brightness of the room lamp 93. Such a change in the brightness might make a passenger feel uncomfortable. The accessories that are sensitive to the change in the supply voltage are registered in the power controller 22 beforehand. The accessories that are sensitive to the change in the supply voltage will hereinbelow be termed a first accessory group. That is, identifiers of the first accessory group are registered in the power controller 22. The power controller 22 monitors states of accessory groups connected to the accessory power line 95 and is capable of acquiring identifiers of accessories that are in operation. The power controller 22 prohibits the first control in a case where at least one accessory in the registered first accessory group is in operation. As a result of the prohibition of the first control, the first accessory group is allowed to operate without being adversely affected by the change in the supply voltage.

When the second control is executed, that is, when the voltage converter 21 is continuously driven while changing the frequency of the carrier signal (carrier frequency), harmonic noise is generated upon change of the frequency of the carrier signal. Some of the accessories are affected by the harmonic noise. In other words, some of the accessories are sensitive to the harmonic noise. An example of such accessories is the radio 94. The harmonic noise could be superposed on an output of the radio 94. The radio output to which the harmonic noise is superposed might make the passenger feel uncomfortable. The accessories that are sensitive to the harmonic noise are registered in the power controller 22 beforehand. The accessories that are sensitive to the harmonic noise will hereinbelow be termed a second accessory group. That is, identifiers of the second accessory group are registered in the power controller 22. The power controller 22 prohibits the second control in a case where at least one accessory in the registered second accessory group is in operation. As a result of the prohibition of the second control, the second accessory group is allowed to operate without being adversely affected by the harmonic noise.

Hereinbelow, the low-noise mode will be described with reference to FIGS. 3 and 4. Hereinbelow, the room lamp 93 will be used as an example of the first accessory group and the radio 94 will be used as an example of the second accessory group for the explanation of the low-noise mode.

The power controller 22 checks whether or not the room lamp 93 is on (step S22). Next, the power controller 22 checks whether or not the radio 94 is on (steps S23, S24). In a case where the room lamp 93 is on and the radio 94 is off (step S22: YES, S24: NO), the power controller 22 prohibits execution of the first control and selects and executes one of the second control and the third control (step S25).

Both the room lamp 93 and the radio 94 are connected to the sub battery 4. When the first control is executed, that is, when the voltage converter 21 is intermittently driven, the voltage of the accessory power line 95, which connects the sub battery 4, the accessories (such as the room lamp 93 and the radio 94) and the voltage converter 21, changes. When the supply voltage to the room lamp 93 changes, the brightness of the room lamp 93 may change. Such flickering of the brightness might make the passenger feel uncomfortable. Due to this, while the room lamp 93 is on, the power controller 22 prohibits the first control and selects and executes one of the second control and the third control. As a result of the prohibition of the first control, the brightness of the room lamp 93 will not change.

In a case where the room lamp 93 is off and the radio 94 is on (step S22: NO, S23: YES), the power controller 22 prohibits execution of the second control and selects and executes one of the first control and the third control (step S23: YES, S26). When the second control is executed, that is, when the voltage converter 21 is continuously driven while changing the frequency of the carrier signal (carrier frequency), the harmonic noise is generated upon change of the frequency of the carrier signal. The harmonic noise might be superposed on the output of the radio 94. Due to this, while the radio 94 is on, the power controller 22 prohibits the second control and selects and executes one of the first control and the third control. As a result of the prohibition of the second control, the noise will not be superposed to the output of the radio 94.

In a case where the room lamp 93 is off and the radio 94 is also off, the power controller 22 selects and executes one of the first control, the second control, and the third control (step S22: NO, step S23: NO, step S27). While the room lamp 93 is off and the radio 94 is off, neither of the first control nor the second control needs to be prohibited. Due to this, the power controller 22 suitably selects one from among the first to third controls and executes the selected control.

In a case where the room lamp 93 is on and the radio 94 is also on, the power controller 22 selects and executes the third control (step S22: YES, step S24: YES, step S28).

Subsequently to the process of S28, the power controller 22 may output, to the instrument panel 24, a signal (recommendation signal) that recommends one of the room lamp 93 (the first accessory group) and the radio 94 (the second accessory group) be turned off. The instrument panel 24 that received the recommendation signal displays a message recommending that one of the room lamp 93 (the first accessory group) and the radio 94 (the second accessory group) be turned off. Alternatively, the instrument panel 24 may turn on a warning lamp that recommends one of the room lamp 93 (the first accessory group) and the radio 94 (the second accessory group) be turned off. Alternatively, the instrument panel 24 may output a voice message that recommends one of the room lamp 93 (the first accessory group) and the radio 94 (the second accessory group) be turned off. The power controller 22 may be configured to execute one of the first control and the second control depending on the type of the accessory that has been turned off.

The power controller 22 repeats the processes of steps S22 to S28 until the main switch of the vehicle is turned off (step S33: NO, S22). When the main switch of the vehicle is turned off, the power controller 22 stops the voltage converter 21 and terminates the process (step S33: YES, S34).

If the states of the room lamp 93 and the radio 94 are changed while the voltage converter 21 is driven, the power controller 22 suitably selects and executes one of the first to third controls according to those states (steps S22 to S28).

In a case where the connector of the external power supplying equipment is disconnected from the charging inlet 8 while the voltage converter 21 is driven in the low-noise mode, the power controller 22 shifts to the normal mode shown in FIG. 2 (step S32: YES, S35).

In the first control, the power controller 22 intermittently drives the voltage converter 21. Alternatively in the first control, the power controller 22 may change the carrier frequency to the second frequency that is lower than the first frequency and may intermittently drive the voltage converter 21.

In the second control, the power controller 22 continuously drives the voltage converter 21 while varying the carrier frequency. In the second control, the power controller 22 adjusts the output of the voltage converter 21 such that the SOC is maintained within the predetermined range (upper limit threshold Sup≥SOC≥lower limit threshold Sd1). In the second control, the power controller 22 may change the carrier frequency in a frequency band lower than the first frequency.

In the third control, the power controller 22 changes the frequency of the carrier signal to the second frequency which is lower than the first frequency to drive the voltage converter 21. Alternatively in the third control, the power controller 22 may change the carrier frequency to the second frequency which is lower than the first frequency and may intermittently drive the voltage converter 21.

Figure 5A:
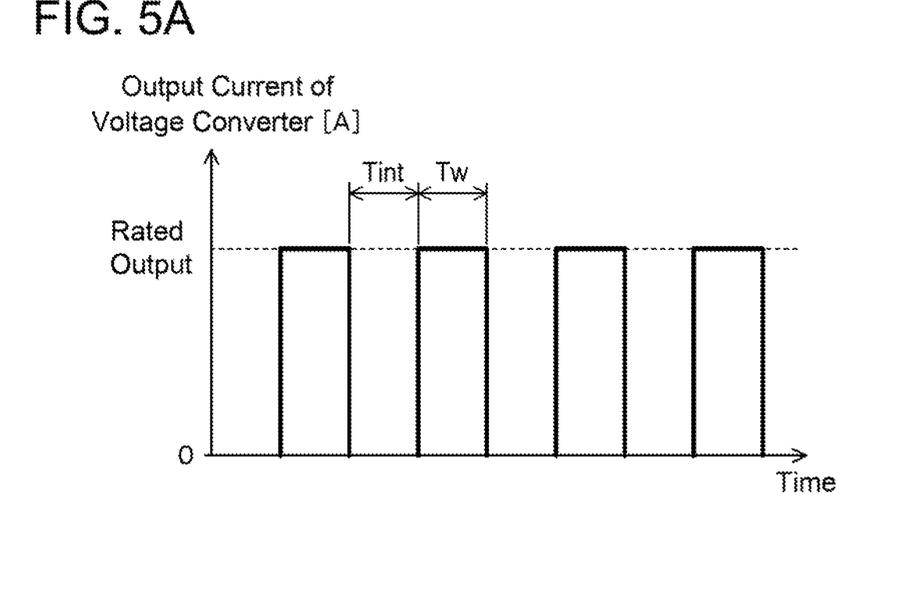
FIG. 5A is a diagram explaining an effect of a first control.
Figure 5B:
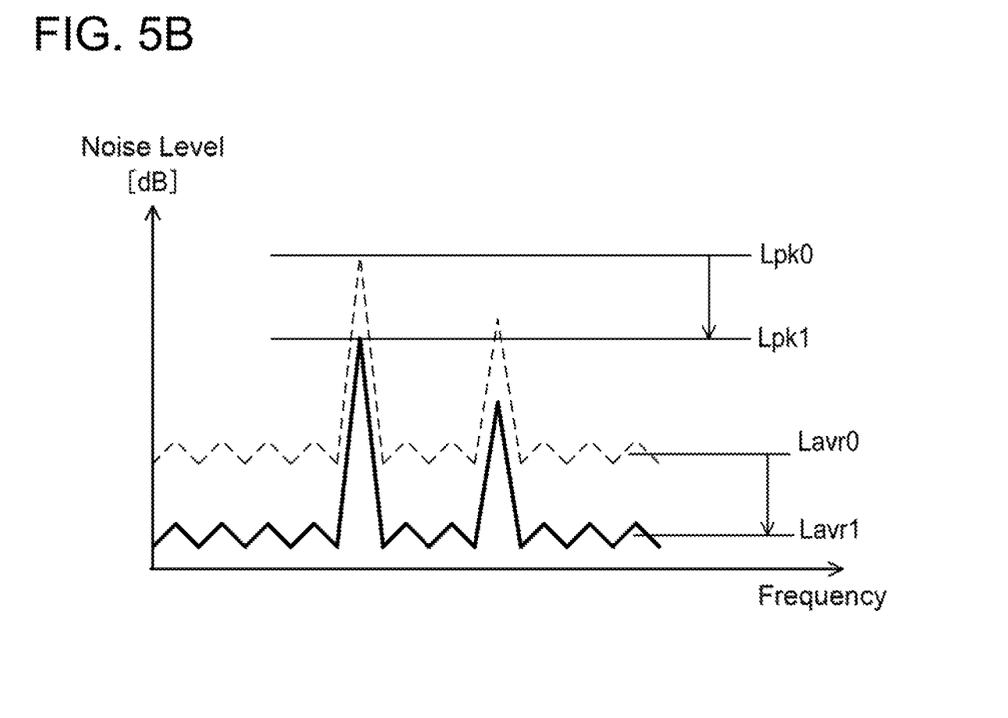
FIG. 5B is a diagram explaining an effect of a first control.

The reasons why the first to third controls reduce the noise as compared to the normal mode will be described. FIGS. 5A and 5B are diagrams for explaining an effect of the first control (the control to intermittently drive the voltage converter 21). FIG. 5A is a time chart for output current of the voltage converter 21 while it is intermittently driven. FIG. 5B shows frequency characteristics of a noise level when the voltage converter 21 is continuously driven (broken line) and a noise level when it is intermittently driven (solid line). Waveforms in FIG. 5B schematically depict the noise. The noise level may be termed noise power.

In the first control, for example, the voltage converter 21 is driven over a time period Tw with an interval time period Tint. The voltage converter 21 outputs a rated current during the time period Tw. The broken line in FIG. 5B shows the frequency characteristics of the noise level when the voltage converter 21 is continuously driven. When the intermittent driving of FIG. 5A is executed, a time average of the noise level decreases as compared to the continuous driving. That is, as compared to the continuous driving, a peak level of the noise decreases from Lpk0 to Lpk1 and an average level of the noise also decreases from Lavr0 to Lavr1. The noise generated by the voltage converter 21 is the switching noise, thus it is not dependent on a magnitude of the output current of the voltage converter 21.

Figure 6A:
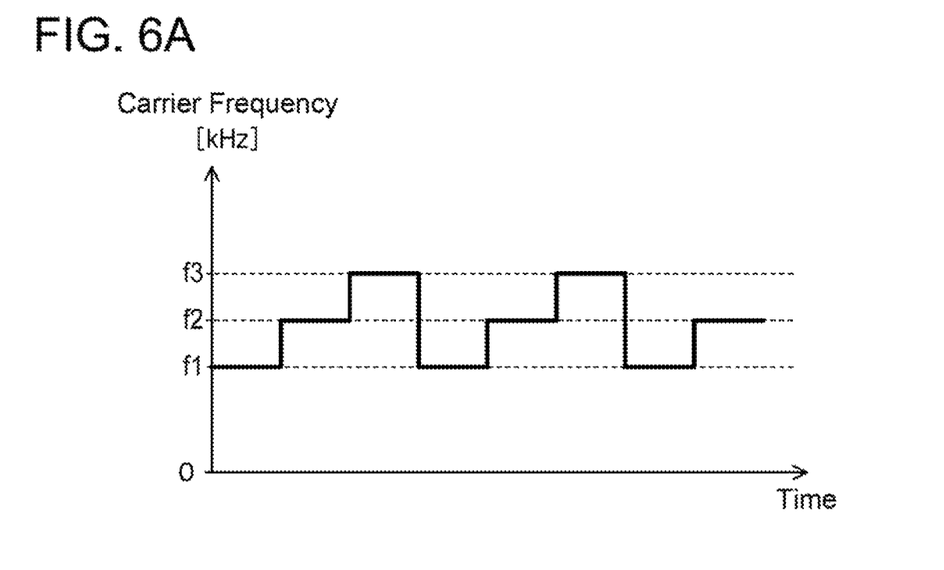
FIG. 6A is a diagram explaining an effect of a second control.
Figure 6B:
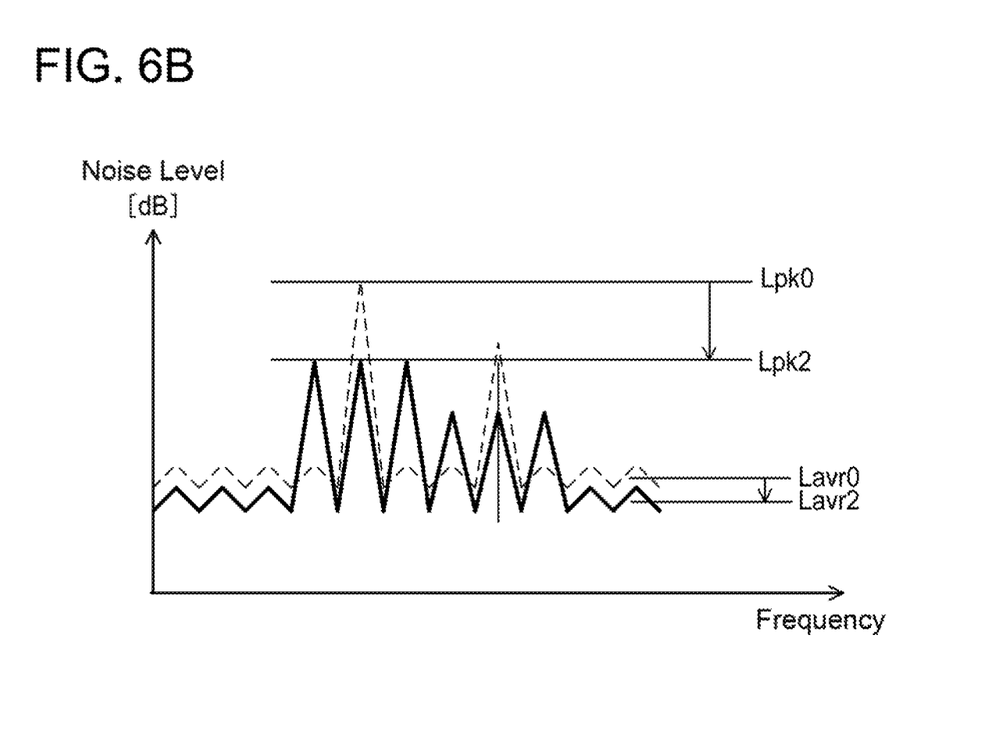
FIG. 6B is a diagram explaining an effect of a second control.

FIGS. 6A and 6B are diagrams for explaining an effect of the second control (the control to continuously drive the voltage converter 21 while varying the carrier frequency). FIG. 6A shows an example of change in the carrier frequency over time. FIG. 6B shows frequency characteristics of the noise level when the voltage converter 21 is continuously driven (broken line) and a noise level when the carrier frequency is changed over time (solid line). Waveforms in FIG. 6B schematically depict the noise.

Since the carrier frequency is changed over time, the peak frequency of the noise is dispersed as shown in 6B. As a result, the peak level of the noise decreases from Lpk0 to Lpk2 as compared to the continuous driving. The average level of the noise decreases from Lavr0 to Lavr2, although this is not as prominent as in the first control.

Figure 7:
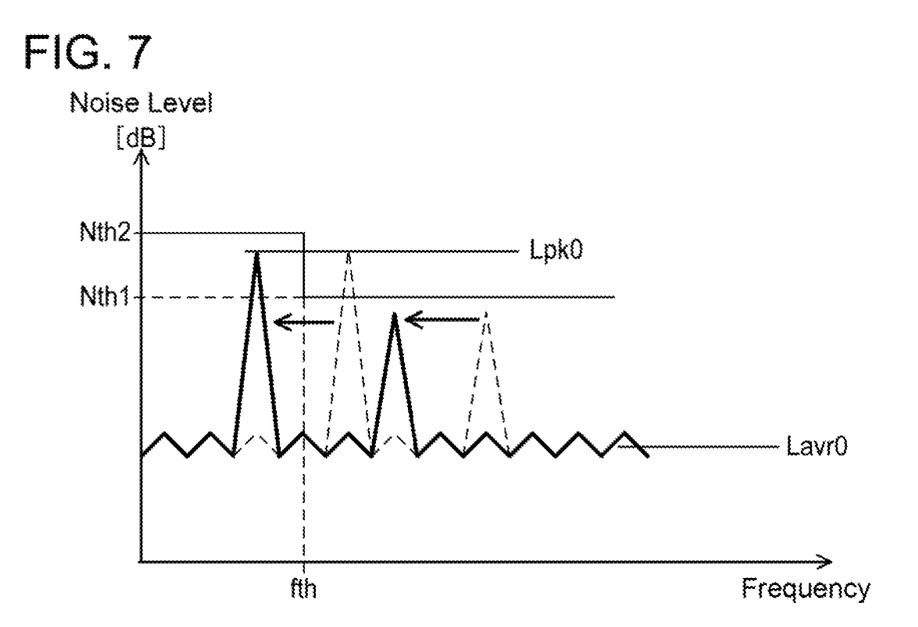
FIG. 7 is a diagram explaining an effect of a third control.

FIG. 7 is a diagram for explaining an effect of the third control (the control to decrease the carrier frequency lower than the first frequency). FIG. 7 shows frequency characteristics of the noise level when the voltage converter 21 is continuously driven with the carrier with a first frequency (broken line) and a noise level when the carrier frequency shifts to the lower than the first frequency (solid line). Since the carrier frequency goes to the lower than the first frequency, the peak frequency of the noise level naturally shifts to the lower frequency side. In general, electric devices including the external power supplying equipment have a high tolerable noise peak level in a low-frequency band. As exemplified in FIG. 7, there may be a case where the tolerable peak level is Nth1 in a frequency band higher than a frequency fth, whereas the tolerable peak level is Nth2 (>Nth1) in a frequency band lower than the frequency fth. In the example of FIG. 7, when the carrier frequency is the first frequency, the peak level Lpk0 exceeds the tolerable peak level Nth1 (see a broken-line graph in FIG. 7). When the peak frequency shifts to the lower side by shifting the carrier frequency, the same peak level Lpk0 comes to be below the tolerable peak level Nth2 (see a solid-line graph in FIG. 7). As above, an influence imposed on the external power supplying equipment can be reduced also by shifting the carrier frequency (peak frequency) lower than the first frequency.

Since only the carrier frequency is shifted to the lower than the first frequency, the noise average Lavr0 does not change. However, when the carrier frequency goes lower and the voltage converter 21 is driven intermittently, both the peak level and the average level of the noise decrease similarly to the case of the first control.

Figure 8:
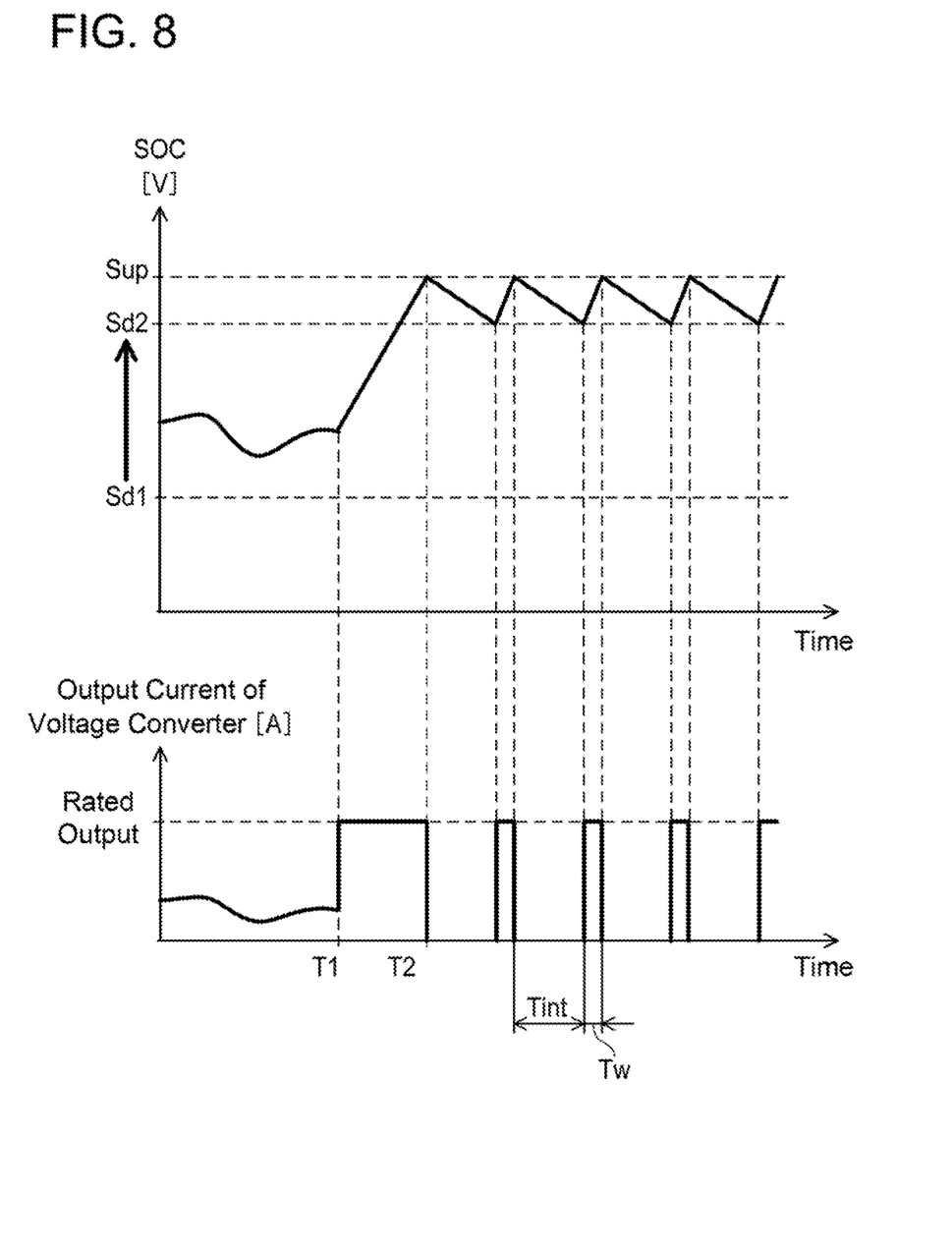
FIG. 8 is a diagram explaining an example of a method of intermittently driving a voltage converter.

An example of a method of the intermittent driving will be described. In the case of continuously driving the voltage converter 21, the power controller 22 adjusts the output of the voltage converter 21 such that the SOC is maintained within the predetermined range (upper limit threshold Sup≥SOC≥lower limit threshold Sd1). In the case of intermittently driving the voltage converter 21, the power controller 22 sets the lower limit threshold higher from Sd1 to Sd2 and causes the voltage converter 21 to maintain a rated output (or an upper limit output), FIG. 8 shows a time chart for the intermittent driving. Until time T1, the power controller 22 continuously drives the voltage converter 21. That is, the power controller 22 adjusts the output of the voltage converter 21 such that the SOC is maintained within the predetermined range (upper limit threshold Sup≥SOC≥lower limit threshold Sd1).

The power controller 22 switches the control of the voltage converter 21 from the continuous driving to the intermittent driving at time T1. At this occasion, the power controller 22 raises the lower limit threshold from Sd1 to Sd2 as well as maintains the output of the voltage converter 21 at the rated output. The power controller 22 causes the voltage converter 21 to maintain the rated output until the SOC exceeds the upper limit threshold Sup. In the example of FIG. 8, the SOC reaches the upper limit threshold Sup at time 12. When the SOC exceeds the upper limit threshold Sup, the power controller 22 stops the voltage converter 21 until the SOC becomes lower than the new lower limit threshold Sd2. When the SOC becomes lower than the new lower limit threshold Sd2, the power controller 22 causes the voltage converter 21 to output the rated output again until the SOC exceeds the upper limit threshold Sup. As described above, the intermittent driving over the driving time period Tw with the interval time period Tint is realized.

Some features related to the teaching explained in the embodiment will be described. When the first control is executed, the voltage of the accessory power line 95 connecting the sub battery 4 and the accessories might change. Due to this, the power controller 22 prohibits the first control while an accessory sensitive to voltage change (the first accessory group), such as the room lamp 93, is in operation. The accessory sensitive to voltage change is not limited to the room lamp 93, and may be another light provided in the vehicle. Further, not all of lights are necessarily sensitive to voltage change. Due to this, the power controller 22 (or the system controller 23) stores identifiers of the first accessory group and simply needs to prohibit the first control in a case where an accessory with this identifier is on.

When the second control is executed, the harmonic noise is generated upon switching of the carrier frequency. Due to this, the power controller 22 prohibits the second control while an accessory sensitive to the harmonic noise (the second accessory group), such as the radio 94, is in operation. Since the third control only decreases the carrier frequency, the voltage of the accessory power line 95 does not change and the harmonic noise is trivial. The accessory sensitive to the harmonic noise is not limited to the radio 94, and may be another accessory provided in the vehicle. Due to this, the power controller 22 (or the system controller 23) stores identifiers of the second accessory group and simply needs to prohibit the second control in a case where an accessory with this identifier is in operation.

In the flowchart of FIG. 3, "room lamp" may be substituted with "at least one accessory that belongs to the first accessory group" and "radio" may be substituted with "at least one accessory that belongs to the second accessory group".

The power controller 22 and the system controller 23 of the embodiment are an example of a controller configured to control the voltage converter 21. The power controller 22 and the system controller 23 control the voltage converter 21 in cooperation. The power controller 22 and the system controller 23 execute one of the first, second, and third controls while the power supplying equipment is connected to the charging inlet 8. However, this may not be the case under unforeseen circumstances, such as when an abnormality is detected in the vehicle. Further, the power controller 22 and the system controller 23 control the voltage converter 21 based on the carrier signal having the first frequency while the power supplying equipment is not connected to the charging inlet 8. However, this may not be the case under unforeseen circumstances, such as when an abnormality is detected in the vehicle.

The "electric vehicle" herein includes a hybrid vehicle provided with both a traction motor and an engine and a vehicle provided with a battery and a fuel cell for a traction motor.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An electric vehicle comprising:
 a main battery configured to supply electric power to a traction motor;
 a sub battery, an output voltage of which is lower than an output voltage of the main battery;
 a voltage converter connected between the main battery and the sub battery, the voltage converter configured to step down a voltage of the main battery to a voltage of the sub battery;
 a charging inlet connected with the main battery and connectable to power supplying equipment located outside the electric vehicle; and
 a controller configured to drive the voltage converter by using a carrier signal having a first frequency while the power supplying equipment is not connected to the charging inlet,
 wherein
 while the charging inlet is connected to the power supplying equipment, the controller is configured to execute one of:
 (1) a first control in which the controller intermittently drives the voltage converter;
 (2) a second control in Which the controller continuously drives the voltage converter while varying a frequency of the carrier signal; and
 (3) a third control in which the controller changes a frequency of the carrier signal from the first frequency to a second frequency to drive the voltage converter, the second frequency being lower than the first frequency.

2. The electric vehicle of claim 1, wherein the controller is configured to execute one of the second control and the third control while the charging inlet is connected to the power supplying equipment and a light connected to the sub battery is on.

3. The electric vehicle of claim 1, wherein the controller is configured to execute one of the first control and the third control while the charging inlet is connected to the power supplying equipment and a radio connected to the sub battery is on.

4. The electric vehicle of claim 1, wherein the controller is configured to execute the third control while the charging inlet is connected to the power supplying equipment and a light and a radio that are connected to the sub battery are both on.

5. The electric vehicle of claim 4, wherein the controller is configured to output a signal recommending that one of the radio and the light be turned off when the charging inlet is connected to the power supplying equipment and the light and the radio connected to the sub battery are both on.

* * * * *